UNITED STATES PATENT OFFICE.

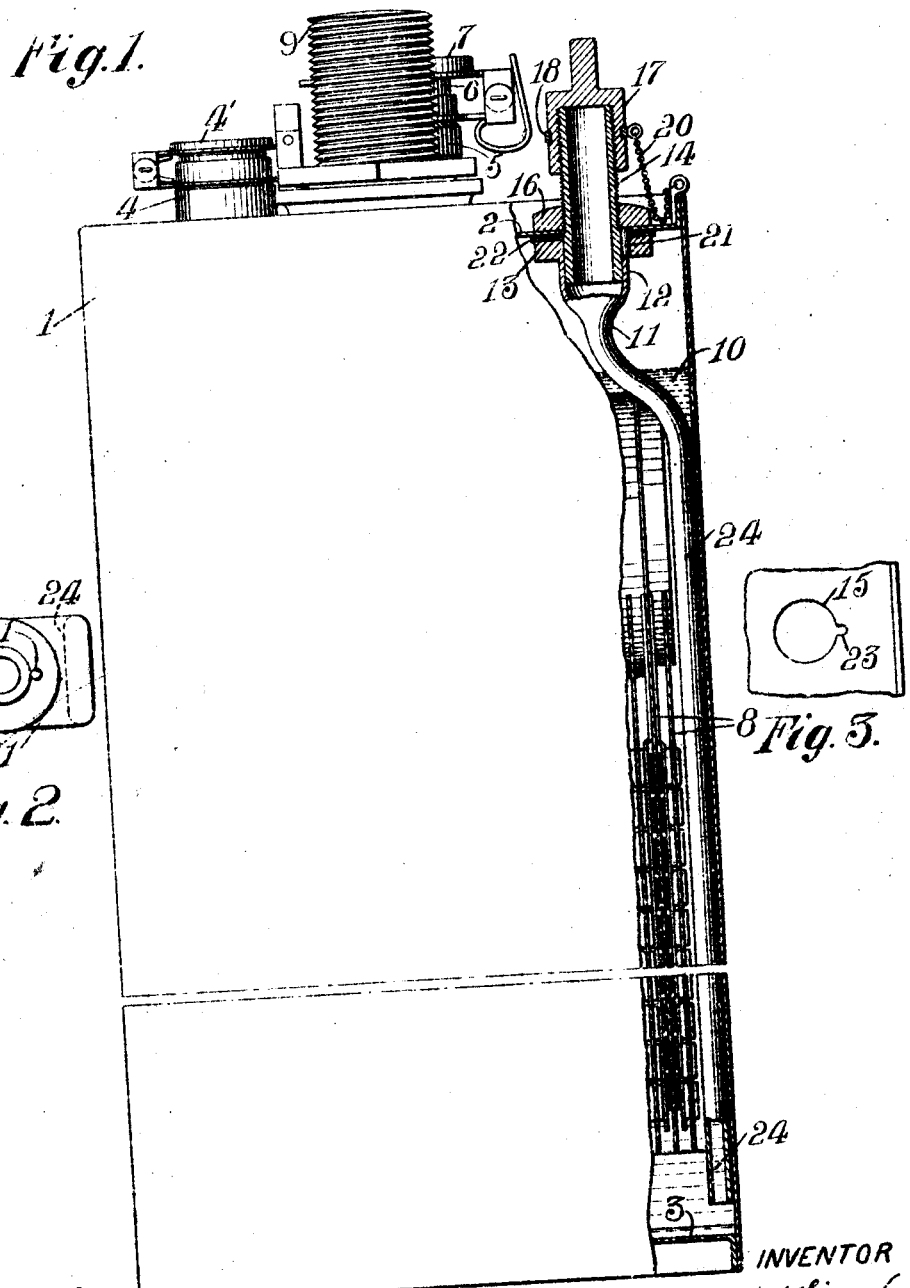

MILLER REESE HUTCHISON, OF WEST ORANGE, NEW JERSEY, ASSIGNOR TO EDISON STORAGE BATTERY COMPANY, OF WEST ORANGE, NEW JERSEY, A CORPORATION OF NEW JERSEY.

STORAGE BATTERY.

1,198,449.   Specification of Letters Patent.   Patented Sept. 19, 1916.

Application filed April 25, 1914. Serial No. 834,293.

*To all whom it may concern:*

Be it known that I, MILLER REESE HUTCHISON, a citizen of the United States, and a resident of Llewellyn Park, West Orange, in the county of Essex and State of New Jersey, have invented certain new and useful Improvements in Storage Batteries, of which the following is a description.

My invention relates to storage batteries and more particularly to means for removing the electrolyte from the interior of storage battery containers.

In the Edison type of storage batteries it is necessary to renew the electrolyte at intervals of approximately one year, and in storage battery cells of this character known as submarine cells, which have a high discharge rate, it is very important and advantageous that the electrolyte may be removed without disturbing the battery cells. This is so because of the fact that these cells are often set up or installed in a very limited space, as for example in submarine vessels, where frequently the battery cells are so located that only the tops thereof are accessible. Because of the inaccessibility of cells so installed it would be very inconvenient and troublesome to remove the electrolyte therefrom in the usual manner, i. e. by tipping or inverting the cells.

The principal object of my invention is to provide improved means whereby the electrolyte may be readily removed from battery cell containers while in an upright position, and thus avoid the necessity of moving or tilting the cells.

Other objects and features of my invention will be hereinafter more fully described and claimed.

For a clearer understanding of my invention, attention is directed to the accompanying drawing, forming a part of this specification and in which:

Figure 1 is a side elevation, partly in section, of an Edison cell equipped with my invention; Fig. 2 is a plan view of the tubular member through which the electrolyte is removed from the cell; and Fig. 3 is a fragmentary plan view of the top of the battery can or container showing the opening therein for the tubular member.

Referring to the drawing, reference character 1 represents the battery can or container having the top 2 and bottom 3 preferably welded to the sides thereof. The top 2 is provided with the usual filling tube or neck 4 and a gas trap or safety device 5 such as is commonly employed in storage batteries of the Edison type, especially those known as submarine cells. The filling tube 4 is provided with the usual hinged lid 4', which, when closed, effectually seals the filling tube against the escape of gases. The gas trap or safety device is preferably of the type described and claimed in my Patent No. 1,130,977, dated March 9, 1915, and entitled Safety devices. The safety device has a tube or neck 6 extending above the container and provided with a lid or cover 7, normally held closed by spring pressure. The neck 6 is provided with suitable openings (not shown) to permit the escape of gases from the cell.

Within the container 1 is the usual group or bank of positive and negative plates or elements 8 containing the active elements of the cell and arranged side by side, the two outside plates of the group being slightly spaced from the adjacent side walls of the container. The plates 8 are connected to poles or terminals extending through the top 2 of the container, one of said poles or terminals being shown at 9.

Reference character 10 represents the electrolyte which should be maintained at a predetermined level in the cell, and for the removal of which I provide a tubular member or drain tube 11 extending to within a short distance from the bottom of the cell. The tubular member or drain tube 11 is provided near its upper end with a short cylindrical portion 12 having a flange 13 and a screw-threaded tubular portion 14 extending through an opening 15 in the top 2 of the can or container 1. For convenience in assembling, the screw-threaded portion 14 is made as a separate piece and is preferably brazed in the cylindrical portion 12 of member 11. The tubular member or drain tube is firmly secured to the container top 2 by means of a nut 16 threaded on the tubular portion 14. A soft rubber washer 22 is disposed between the flange 13 and top 2 of the container and when nut 16 is tightened this washer is compressed and expanded laterally to form a tight joint between the top 2 and the drain tube. The outer end of the drain tube is normally closed by an interiorly threaded cap 17 applied to the screw-threaded portion 14. The cap 17 has an annular groove in which is loosely mounted a ring 18 having a chain connection 20 with the container to prevent the loss of the cap when the same is removed from the drain tube. The flange 13 is provided with an upwardly extending pin 21 which projects through the washer 22 and the top 2 of the container, the opening 15 in top 2 having an off-set portion 23, as shown in Fig. 3, to accommodate the pin 21. The pin 21 and off-set portion 23 of opening 15 act as a lock to prevent turning of the tubular member or drain tube 11, or displacement thereof from the position shown in Fig. 1.

Below the cylindrical portion 12 the drain tube 11 is provided with an off-set downwardly extending flattened portion 24 whereby the same may be readily disposed in the small space between one of the outermost plates 8 and the adjacent wall of the container 1 as clearly shown in Fig. 1.

It will be apparent that the tubular member or drain tube 11 may be readily applied to storage batteries of the type shown, without necessitating any changes in the construction of the batteries or in the arrangement of the parts thereof.

To remove the electrolyte from the battery can or container 1, the cap 17 is removed from the screw-threaded tubular portion 14, a tube applied to the latter and the electrolyte siphoned out; or, after the removal of cap 17, pressure may be applied to the surface of the electrolyte and the latter forced out of the container 1 through drain tube 11. In the latter case, fluid under pressure, preferably air, may be pumped into the container through the neck of the safety device or gas trap 5.

While I have described my invention as applied to a storage battery cell, it is obvious that it is adapted for application, generally, to containers from which it is desired to remove fluid in the manner described herein.

It is to be understood that many changes may be made in the specific form of my invention illustrated and described herein without any departure from the spirit of the invention and the scope of the claims.

Having now described my invention, what I claim as new and desire to protect by Letters Patent of the United States is as follows:

1. In a storage battery cell, the combination with the battery can or container, of means whereby the electrolyte of the cell may be removed from the container when the cell is in an upright position, said means comprising a tubular member removably connected to the top of the container and projecting above the same and having a lower open end terminating adjacent the bottom of the container, said member and the top of the container being provided with coacting means for preventing turning of the member, substantially as described.

2. In a storage battery cell, the combination with the closed battery can or container and the group of positive and negative elements or plates supported and assembled side by side therein, of a tubular member having an upper end portion projecting through the top of the container and terminating above the latter and a flattened portion extending downwardly from said upper end portion to within a short distance from the bottom of the container, said flattened portion being disposed between one of the outside plates of said group and the adjacent wall of the container, substantially as described.

3. In a storage battery cell, the combination with the closed battery can or container and the group of positive and negative elements or plates supported and assembled side by side therein, of a tubular member having an upper end portion projecting through the top of the container and terminating above the latter and a flattened portion extending downwardly from said upper end portion to within a short distance from the bottom of the container, said flattened portion being disposed between one of the outside plates of said group and the adjacent wall of the container, the top of the container and said tubular member being provided with coacting means to prevent turning of the latter, substantially as described.

4. In a storage battery cell, the combination with the closed battery can or container, said container being provided with a safety device for controlling the escape of gases from the cell, of a tube applied to and supported by the top of said container through which the electrolyte will flow from the latter upon forcing fluid under pressure into the container through said safety device, said tube terminating above the container and having a flattened portion within the container extending nearly to the bottom of the latter, substantially as described.

This specification signed and witnessed this 23rd day of April, 1914.

MILLER REESE HUTCHISON.

Witnesses:
WILLIAM A. HARDY,
MARY J. LAIDLAW.